(12) United States Patent
Majima

(10) Patent No.: US 6,761,147 B2
(45) Date of Patent: Jul. 13, 2004

(54) CONTROL APPARATUS AND METHOD FOR INTERNAL COMBUSTION ENGINE

(75) Inventor: Yoshihiro Majima, Inuyama (JP)

(73) Assignee: DENSO Corporation, Kariya (JP)

(*) Notice: Subject to any disclaimer, the term of this patent is extended or adjusted under 35 U.S.C. 154(b) by 290 days.

(21) Appl. No.: 09/977,942

(22) Filed: Oct. 17, 2001

(65) Prior Publication Data
US 2002/0043243 A1 Apr. 18, 2002

(30) Foreign Application Priority Data

Oct. 18, 2000 (JP) ........................................ 2000-317810
Mar. 1, 2001 (JP) ........................................ 2001-056075

(51) Int. Cl.$^7$ ............................ F02D 13/02; F02D 41/06
(52) U.S. Cl. ..................... 123/399; 123/478; 123/90.15; 123/198 DB
(58) Field of Search ............................ 123/478, 90.15, 123/198 DC, 399

(56) References Cited

U.S. PATENT DOCUMENTS

| | | | |
|---|---|---|---|
| 6,024,062 A | * | 2/2000 | Kako et al. ............... 123/90.17 |
| 6,055,948 A | * | 5/2000 | Shiraishi et al. .......... 123/90.15 |
| 6,082,315 A | | 7/2000 | Schneider ................. 123/90.11 |
| 6,360,531 B1 | * | 3/2002 | Wiemero et al. ............... 60/284 |
| 6,397,803 B1 | * | 6/2002 | Fujiwara et al. ......... 123/90.15 |
| 6,446,602 B1 | * | 9/2002 | Yonezawa et al. ..... 123/406.62 |
| 6,560,959 B2 | * | 5/2003 | Katsuta et al. ................. 60/284 |
| 2002/0073955 A1 | * | 6/2002 | Collins et al. ......... 123/198 DB |
| 2003/0163243 A1 | * | 8/2003 | Inoue .......................... 701/112 |
| 2004/0020467 A1 | * | 2/2004 | Leman et al. ................ 123/467 |

FOREIGN PATENT DOCUMENTS

JP 7-233713 9/1995
JP 256908 * 9/2002 ........... F02D/13/02

* cited by examiner

Primary Examiner—Hai Huynh
(74) Attorney, Agent, or Firm—Nixon & Vanderhye P.C.

(57) ABSTRACT

Processing conditions are determined on the basis of an operation range. After IG-OFF, an intake valve opening timing is advanced to 20° CA BTDC, and an exhaust valve closing timing is retarded to 20° CA ATDC. By controlling the intake and exhaust valve timings as described above, it is possible to reduce the fuel sticking to the intake passage. Particularly in the case of cold engine starting before activation of the catalyst, it is possible to prevent direct exhaust of HC emissions and accordingly to reduce emissions because of the decreased amount of fuel sticking to the intake passage.

27 Claims, 11 Drawing Sheets

FIG. 6A ROTATION SPEED Ne
FIG. 6B CLOSING TIMING OF INTAKE VALVE
FIG. 6C CLOSING TIMING OF EXHAUST VALVE
FIG. 6D INJECTION PULSE
FIG. 6E INTAKE PIPE PRESSURE
FIG. 6F THROTTLE ANGLE
FIG. 6G WET
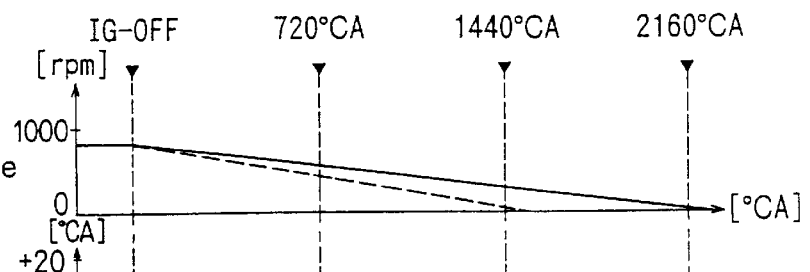
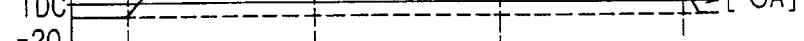
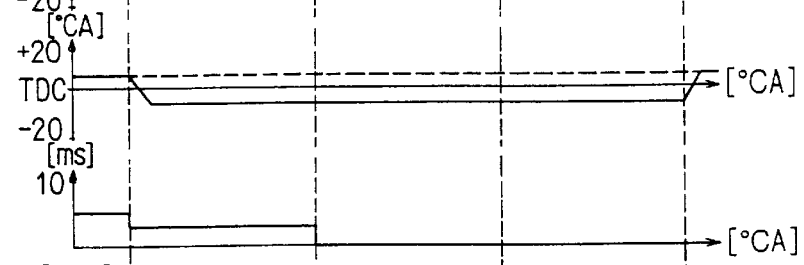
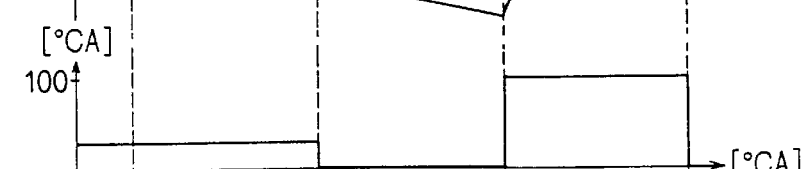
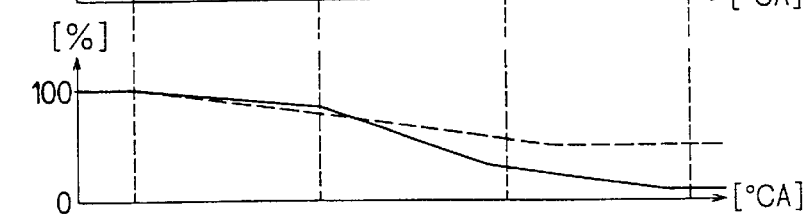

CONTROL APPARATUS AND METHOD FOR INTERNAL COMBUSTION ENGINE

CROSS REFERENCE TO RELATED APPLICATION

This application is based on and incorporates herein by reference Japanese Patent Application Nos. 2000-317810 filed on Oct. 18, 2000, and 2001-56075 filed on Mar. 1, 2001.

BACKGROUND OF THE INVENTION

1. Field of the Invention

The present invention relates to a control apparatus for an internal combustion.

2. Description of Related Art

There has been conventionally known a valve timing control apparatus for advancing and retarding intake and exhaust valve timing by changing the phase of camshaft rotation in accordance with an engine speed. In the internal combustion engine in which the fuel is injected into an intake pipe, not limited to the internal combustion engine equipped with a fuel injection valve, the fuel injected from the fuel injection valve sticks to the intake pipe. When the engine is running in a steady state, the amount of vaporized portion of the fuel sticking to the intake pipe and the amount of a part of the fuel injected from the fuel injection valve and newly sticking to the intake pipe are balanced. The air-fuel ratio, therefore, will not be affected by the amount of the fuel sticking to the intake pipe.

However, when the driver turns off the ignition switch in an attempt to stop the engine, the fuel sticking to the intake pipe will remain in the intake pipe. In this state, when the ignition switch is turned on to restart the engine, the fuel to be injected from the fuel injection valve and also the fuel remaining in the intake pipe are both drawn for combustion into the combustion chamber, thereby not only enriching the air-fuel ratio but producing much of HC emissions. Particularly upon starting the engine cold, the catalyst is not activated and therefore HC emissions will be discharged out to the atmosphere without being cleaned.

Further, the variable valve control apparatus in practical use is in most cases designed to change the intake valve timing and lift. For example, in partial-load operation, the intake valve timing is advanced to increase the amount of valve overlap to increase the amount of internal EGR gases (residual gases) and to reduce a pumping loss for improving fuel economy, and also to warm up the intake air by the internal EGR to accelerate atomization of injected fuel and accordingly to reduce the amount of HC emissions.

During idling or low-load operation when a small amount of air is taken in, the intake valve timing is advanced (the amount of valve overlap is increased) to increase the amount of internal EGR gases, residual gases are blown back to the intake side, to disturb the charge of the intake air into the engine cylinder. There is, therefore, a possibility of aggravation of exhaust emissions due to poor fuel combustion, and unstable engine rotation because of increased engine vibration. In this case, however, if the intake valve timing is retarded (the amount of valve overlap is decreased) and the amount of internal EGR gases is reduced for the purpose of improving combustion stability by achieving an intake air charging performance, the intake air warm-up effect by the internal EGR gases will decrease, thereby failing in gaining the effect of decreasing the amount of HC emissions.

That is, in a system, like a conventional system, which changes the operation characteristics of the intake valve (valve timing and lift) during the intake stroke, when the operation characteristics of the intake valve are controlled toward improving the intake air warm-up performance, the system is likely to operate to lower the intake air charge performance. Under such an operating condition, both the intake air warm-up performance and the charge performance cannot exist on a high level. Therefore, it is impossible to satisfy such increasingly strict requirements for improving exhaust emissions, fuel economy, and stability of engine operation.

SUMMARY OF THE INVENTION

A first object of the present invention is to provide a control apparatus for an internal combustion engine which is capable of reducing an amount of fuel sticking to an intake pipe after the internal combustion engine is stopped.

According to a first aspect of the present invention, an intake-exhaust valve timing setting means of a control apparatus for internal combustion engine sets a valve timing of at least one of an intake valve and an exhaust valve to a specific valve timing. At this specific valve timing, it is possible to reduce the amount of fuel sticking to the intake pipe of the internal combustion engine by detecting that an ignition switch is turned off by an ignition signal detecting means.

Since the above-described control is conducted after the ignition switch is turned off, the amount of fuel sticking to the intake pipe can be reduced. Therefore, much of HC emissions will not occur when the catalyst is still in a state before activation at the time of subsequent engine starting. It is, therefore, possible to control the discharge of the HC emissions out into the atmosphere.

The variable valve timing mechanism of the present invention may be either a variable intake valve timing mechanism which controls only the intake valve timing, or may be a variable exhaust valve timing mechanism which controls only the exhaust valve timing, or may be a variable intake-exhaust valve timing mechanism comprising a combination of both valve timing mechanisms. The catalyst may be a catalyst having a capacity to adsorb, to absorb and store, and/or to clean the HC emissions. For example, the catalyst may be a three-way catalyst or an HC adsorbing catalyst. Furthermore, the valve timing mechanism of the present invention may be a valve timing mechanism which changes the valve timing by variably setting the lift, or may be such valve timing mechanism that freely sets both the lift and the valve timing.

According to a second aspect of the present invention, a method for controlling an internal combustion engine is provided with a variable valve timing mechanism which freely sets the valve timing by driving at least one of an intake valve and an exhaust valve which open and close the intake air passage and the exhaust gas passage communicating with the combustion chamber of the internal combustion engine, and the catalyst provided in the exhaust gas passage to adsorb and/or clean the exhaust gases discharged from the internal combustion engine. This control method has two steps: detecting the ignition switch turned to off, and setting the valve timing of at least one of the intake valve and exhaust valve to a specific value for reducing the fuel sticking to the intake pipe of the internal combustion engine after detecting the ignition switch in off position.

Thus, it is possible to reduce the amount of fuel sticking to the intake pipe interior. Therefore, at the time of subsequent engine starting, little amount of fuel sticking to the intake pipe interior if the catalyst for occluding, adsorbing and/or cleaning discharged HC emissions is not in an activated state, thereby enabling the reduction of the HC emissions.

A second object of the present invention is to provide a valve control apparatus for an internal combustion engine which is capable of achieving both an intake air warm-up performance and an intake air charge performing on a high level, and also is capable of improving exhaust emissions, fuel economy, and stability of engine rotation.

There has recently been developed a valve control apparatus which can easily drive intake and exhaust valves by an electromagnetic actuator without regard to the crank angle, and control the electromagnetic actuator by an engine control circuit (a valve control means).

With attention paid to this point, according to a third aspect of the present invention, a valve control means controls the intake valve to open multiple times per cycle of rotation of the internal combustion engine. By designing the valve control device, it is possible to separately open, per cycle, the intake valve to warm up the intake air with combustion gases in the cylinder and to charge the intake air into the cylinder at the optimum timing, thereby achieving both the intake air warm-up performance and charge performance on a high level. Therefore, the fuel economy and the stability of engine rotation can be enhanced by the effect of improving combustion stability by achieving the intake air charge performance while reducing the amount of HC emissions through the effect of reducing a wet portion of injected fuel by the warmed-up intake air and the effect of accelerating atomization (the effect of improvement in combustibility).

BRIEF DESCRIPTION OF THE DRAWINGS

Additional objects and advantages of the present invention will be more readily apparent from the following detailed description of preferred embodiments thereof when taken together with the accompanying drawings in which:

FIG. 6 is a timing chart showing the engine control (first embodiment);

DETAILED DESCRIPTION OF PREFERRED EMBODIMENTS

First Embodiment

The first embodiment of the valve timing control apparatus embodied in a gasoline engine will be described with reference to FIGS. 1–6.

Figure 1:
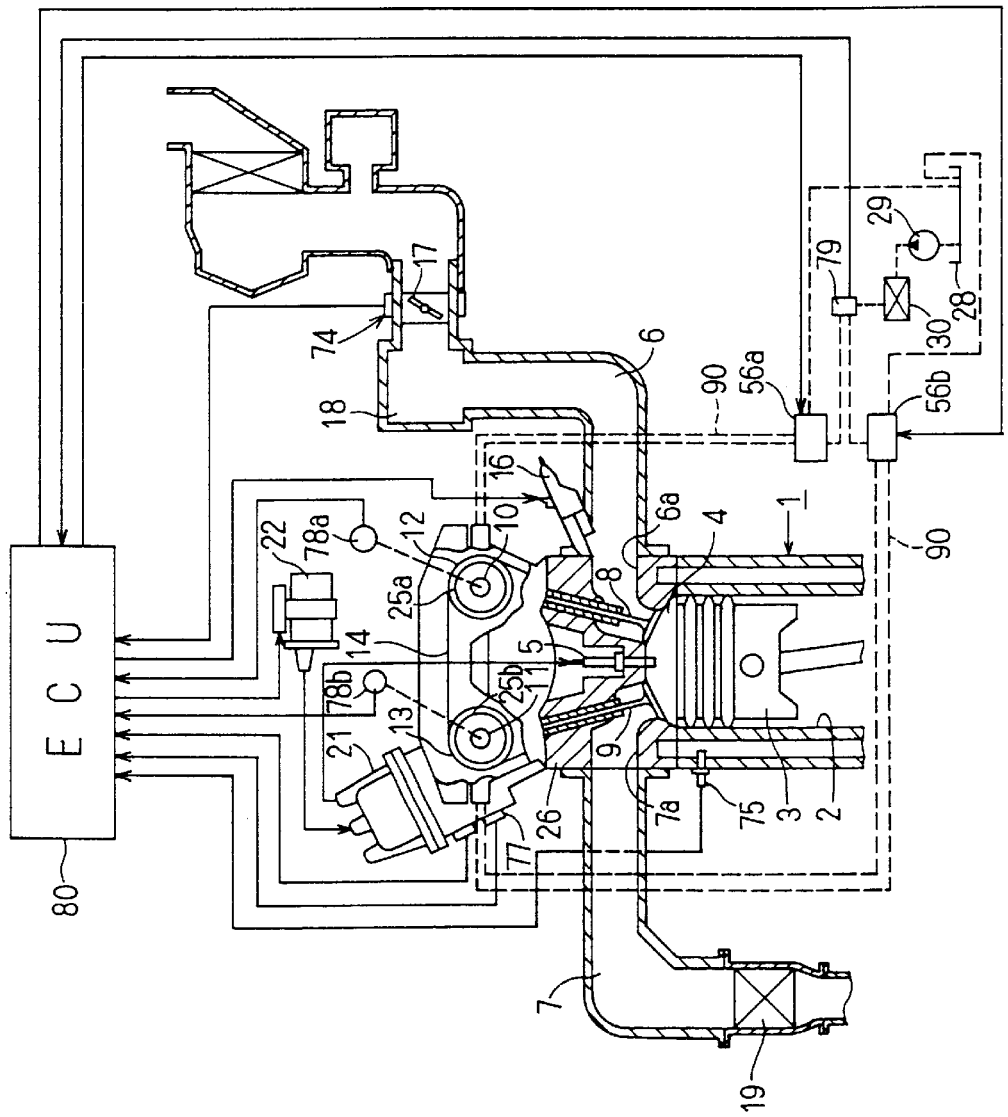
FIG. 1 is a schematic view showing a control apparatus for an internal combustion engine (first embodiment)

FIG. 1 shows a valve timing control apparatus for internal combustion engine in the first embodiment. An engine 1 as the internal combustion engine with a plurality of cylinders 2 has a piston 3 which is vertically movably mounted in each cylinder. A combustion chamber 4 is formed above the piston 3. A spark plug 5 is mounted in each combustion chamber 4. Furthermore, in each combustion chamber 4, an intake passage 6 communicating with an intake port 6a and an exhaust passage 7 communicating with an exhaust port 7a are formed. At the downstream of the exhaust passage 7, a three-way catalyst 19 is installed for cleaning the HC emissions. The catalyst disposed at the downstream of the exhaust passage 7 is not limited to the three-way catalyst 19 and may be a catalyst that is capable of adsorbing or occluding the HC emissions. For example, the catalyst may be an HC adsorbing catalyst or may be a plurality of combinations of these catalysts. In the intake port 6a and the exhaust port 7a, an intake valve 8 and an exhaust valve 9 are provided for opening and closing these ports. The intake valve 8 and the exhaust valve 9 are driven to rotate by an intake side camshaft 10 and an exhaust side camshaft 11, respectively. At one end of either of the camshafts 10, 11, an intake side timing pulley 12 and an exhaust side timing pulley 13 are provided. The timing pulleys 12, 13 are connected with a crankshaft (not illustrated) through a timing belt 14.

Therefore, during the operation of the engine 1, the rotation from the engine 1 is transmitted from the crankshaft to the camshafts 10, 11 through the timing belt 14 and the timing pulleys 12, 13, thereby opening and closing the intake valve 8 and the exhaust valve 9. The intake valve 8 and the exhaust valve 9 are driven at a specific valve timing synchronously with the rotation of the crankshaft and a series of four strokes: intake stroke, compression stroke, explosion stroke, and exhaust stroke. An injector 16 for fuel injection is mounted in the vicinity of the intake port 6a in each cylinder.

In the intake passage 6, a throttle valve 17 is installed. The opening and closing operation of the throttle valve 17 is electrically controlled on the basis of the operation of an accelerator pedal (not illustrated). As the throttle valve 17 is opened and closed, the amount of outside air to be taken into the intake passage 6, that is, the amount of intake air, is controlled. At the downstream side of the throttle valve 17, a surge tank 18 is mounted for reducing intake air pulsation. Also in the vicinity of the throttle valve 17, a throttle sensor 74 is mounted for detecting the throttle angle TA. Furthermore, in the engine 1, a water temperature sensor 75 is installed for detecting the cooling water temperature THW.

To each spark plug 5, an ignition signal is supplied from a distributor 21. The distributor 21 has a built-in rotor (not illustrated) which rotates in synchronization with the rotation of the crankshaft connected with the camshaft 11 on the exhaust side. In the distributor 21, a rotation speed sensor 76 is provided for detecting the rotation speed of the engine 1 (rotations per minute of the engine) Ne from rotor rotation. Furthermore, in the distributor 21, a cylinder discriminating sensor 77 is provided for detecting at a specific rate the reference position GP of crank angle of the engine 1 in accordance with the rotation of the rotor. In the present embodiment, the crankshaft rotates twice per a series of four strokes of operation of the engine 1. The rotation speed sensor 76 detects the crank angle at a rate of 30° CA per pulse. Furthermore, the cylinder determination sensor 77 detects the crank angle at a rate of 360° CA per pulse.

In the intake side timing pulley 12, a hydraulic variable intake valve timing mechanism 25a is installed. The valve timing mechanism 25a is hydraulically driven to variably set the valve timing of the intake valve 8. Similarly, in the exhaust side timing pulley 13, a variable exhaust valve timing mechanism 25b is installed.

An oil pan 28 and an oil pump 29 form an engine lubrication system. The oil pump 29 suctions the oil from the oil pan 28. Thus, the suctioned oil flows into an oil path 90 through an oil filter 30. The oil that has entered the oil path 90 is so controlled as to operate the variable intake valve timing mechanism 25a to the advance side or the retard side by means of the oil control valve 56a. The oil path 90 is branched and controlled to allow the oil flow to operate the variable exhaust valve timing mechanism 25b to the advance side or the retard side by means of the oil control valve 56b similarly to the variable intake valve timing mechanism 25a.

The oil control valves 56a, 56b are electromagnetic solenoid valves, the spool amount of which is determined by the duty ratio of the electric voltage to be applied. That is, the variable valve timing mechanisms 25a, 25b are advanced or retarded by changing the amount of spool of the oil control valves 56a, 56b. The oil control valves 56a, 56b to be used may be conventionally known hydraulic control valves.

The variable valve timing mechanisms 25a, 25b are provided with a vane (not illustrated). By applying an oil pressure to turn the vane to the advance or retard side, the variable valve timing mechanisms 25a, 25b are advanced or retarded. In this case, it should be understood that the present invention is not limited to the vane-type variable valve timing mechanism conventionally known, and may be a conventionally known helical-type variable valve timing mechanism. Furthermore, the valve timing mechanism to be adopted may be such a type that can variably set the lift to set the valve timing, and also such a type that can freely set the valve timing and the lift electromagnetically.

The oil control valves 56a, 56b for advancing or retarding the intake and exhaust valve timing mechanisms 25a, 25b are electrically connected to the ECU 80 to control the spool amount of the oil control valves 56a, 56b.

Figure 2:
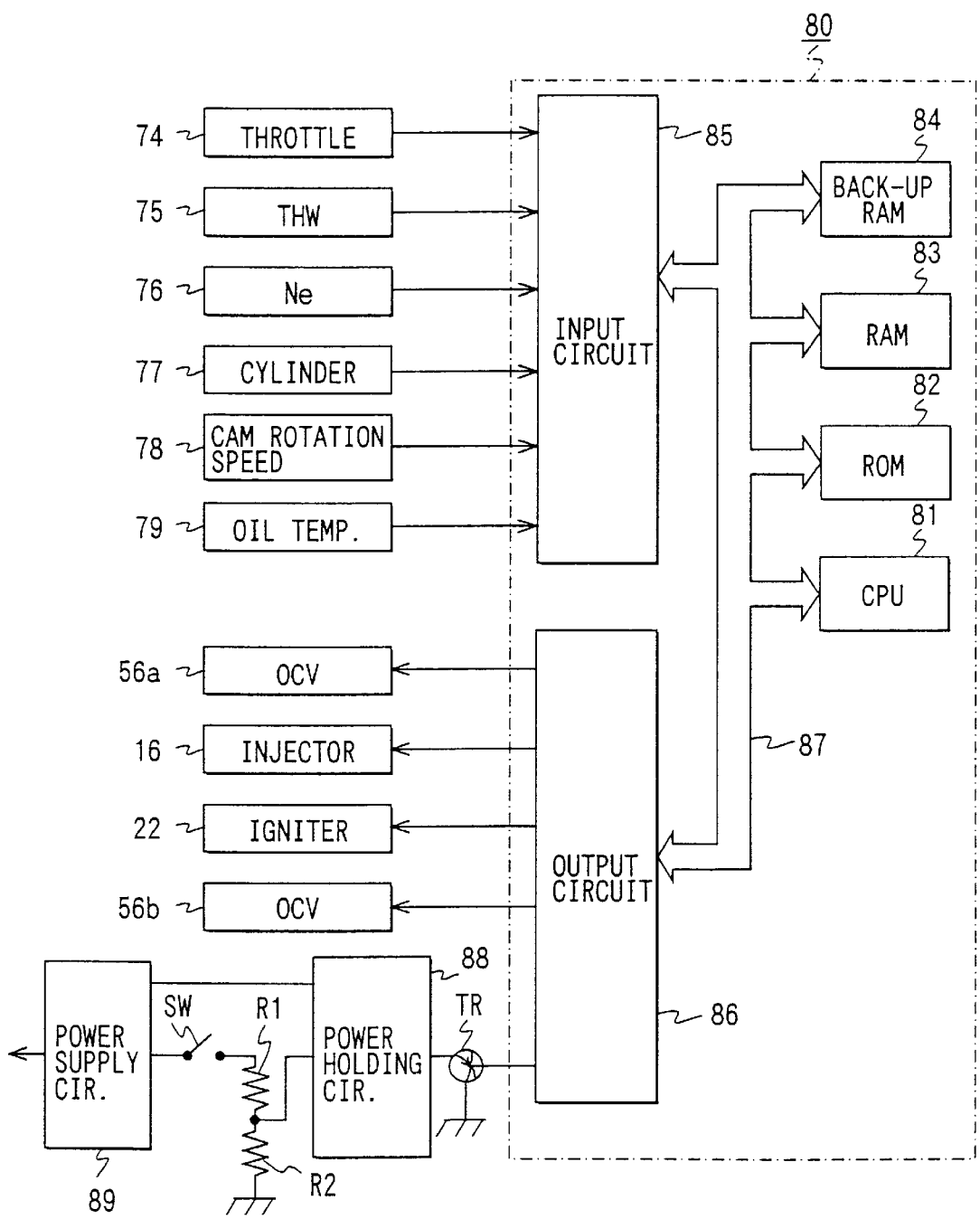
FIG. 2 is a block diagram showing a constitution of ECU (first embodiment)

FIG. 2 shows a configuration of the ECU 80. The configuration of the ECU 80 will be described with reference to FIG. 2. The ECU 80 is connected to the throttle sensor 74, the water temperature sensor 75, the rotation speed sensor 76, the cylinder determination sensor 77, the cam rotation angle sensors 78a, 78b, and the oil temperature sensor 79. The ECU 80 controls the operation of the injector 16, igniter 22, and oil control valves 56a, 56b in accordance with output signals supplied from the sensors 74–79. Next, an electrical constitution relative to the ECU 80 will be explained. The ECU 80 includes a CPU (central processing unit) 81, a ROM (read-only memory) 82 for reading a specific control program prestored, a RAM (random-access memory) 83 for temporarily storing operation results or suchlike of the CPU 81, and a back-up RAM 84 for storing the prestored data. The ECU 80 is connected with an input circuit 85 inclusive of an analog/digital converter and an output circuit 86 by a bus 87 in relation to these members 81–84.

The input circuit 85 is connected with the throttle sensor 74, water temperature sensor 75, rotation speed sensor 76, cylinder determination sensor 77, cam rotation angle sensor 78, and oil temperature sensor 79. On the other hand, the output circuit 86 is connected with the injector 16, igniter 22, and oil control valves 56a, 56b.

The CPU 81 stores in a specific area in the RAM 83 which reads detection signals as input values supplied from sensors 74–79 and various other sensors (not illustrated) through the input circuit 85. Furthermore, the CPU 81 controls the injector 16, igniter 22, and oil control valves 56a, 56b as required, in order to execute the controls of fuel injection amount, ignition timing, idling speed, and valve timing on the basis of input values read in from the sensors 74–79 and also from the various sensors.

In addition to the above-described configuration, there is adopted a circuit which is so formed as to supply the power from the power supply to each circuit even after turning off the ignition switch. This circuit controls the valve timing after turning the ignition switch SW off.

The output circuit 86 is connected with the base terminal of a transistor TR. The emitter terminal of the transistor TR is connected with the input terminal of the power supply holding circuit 88. The collector terminal is not grounded. The other input terminal of the power supply holding circuit 88 is connected with a power supply circuit 89 including a battery through the switch SW. Between the ignition switch SW and the power supply holding circuit 88, a resistor R1 is connected. The negative terminal of the resistor R1 is connected through a resistor R2. The output terminal of the power supply holding circuit 88 is connected with the power supply circuit 89. The power supply circuit 89 is connected to each onboard electric circuit, and supplies the electric power with stability. The power supply circuit 89 works with a HIGH signal from the power supply holding circuit 88 and stops with a LOW signal.

The power supply holding circuit 88 is designed to output the HIGH signal from the output terminal when the ignition switch is on. When a drive signal is outputted from the output circuit 86 to the transistor TR, the transistor TR works to output the HIGH signal from the output terminal of the power supply holding circuit 88. The power supply holding circuit 88 can be attained by an OR gate and a relay disclosed in JP-A-60-166705.

Figure 3:
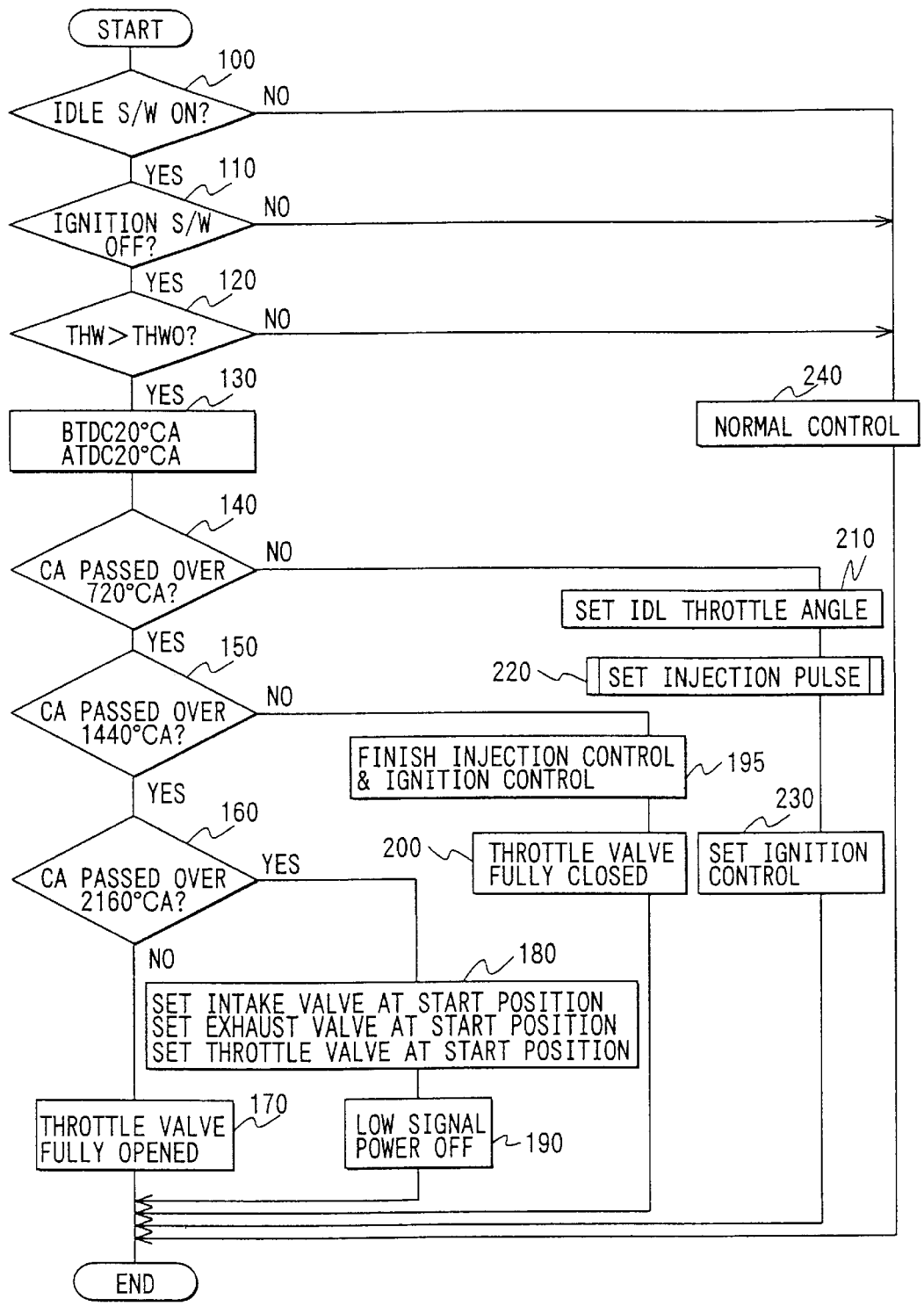
FIG. 3 is a flowchart showing a main control program (first embodiment)

Details of processing to be executed by the ECU 80, details will be described. FIG. 3 is a flowchart showing a control routine to be executed by the ECU 80 in order to change the valve timings of the intake valve 8 and the exhaust valve 9 when the ignition switch SW is turned off from the operating state of the engine 1. The routine processing is carried out when the ignition switch SW is turned off.

First, at Steps 100–120, whether or not the engine operation range satisfies to the condition of execution of the routine is decided. The processing proceeds to Step 240 when the idle switch is off at Step 100. If the ignition switch is on at Step 110, and the engine cooling water temperature detected by the water temperature sensor is below a specific value at Step 120, and if at least one of these three conditions is satisfied, the processing proceeds to Step 240. That is, if the condition of at least one of Steps 100–120 is determined NO, the step is regarded unsuitable to the condition of this control to be performed, thereby proceeding to Step 240. At Step 240 the amount of opening of the throttle valve 17, the amount of fuel injected from the injector 16,the ignition timing of the spark plug 5, and the amount of lift of the oil control valves 56a, 56b for controlling a desired intake and exhaust valve timings are controlled on the basis of the operating condition of the engine. To perform the control in accordance with the operating condition, the optimum map is used, which is achieved by carrying out calculation or tests based on the engine cooling water temperature detected by the water temperature sensor 75, the engine speed detected by the speed sensor 76, the amount of opening of the throttle valve detected by the throttle position sensor 74, and output values detected by unillustrated airflow meter, A/F sensor, etc.

Figure 4:
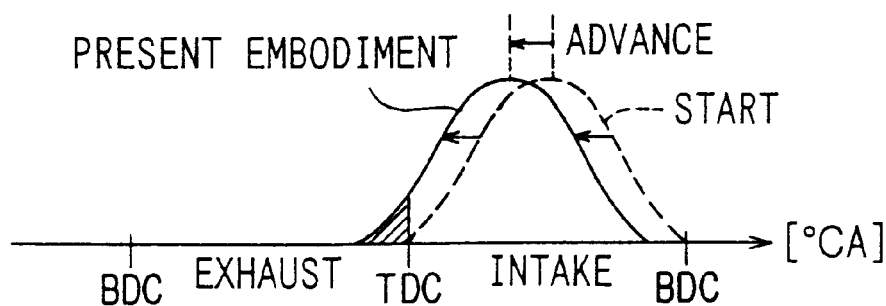
FIG. 4 is a view showing an intake valve timing (first embodiment)

When the result of determination is YES at all of Steps 100–120, it is considered that the condition of execution of the routine has been satisfied, thereby proceeding to Step 130. At Step 130, the valve timings of the intake and exhaust valves 8, 9 are changed. The intake valve 8 is set on the advance side, while the exhaust valve 9 is set on the retard side. If the valve timing of the intake valve 8 during starting or idling, as shown in FIG. 4, is set on the advance side from TDC, the intake valve 8 is opened when the piston 3 is pushed upwardly, unburned gases and burned gases (hereafter the EGR gas) are blown back into the intake port 6*a*. With the blow of the EGR gas after combustion back into the intake port 6*a*, the fuel sticking to the intake port 6*a* evaporates, thereby accelerating fuel atomization. With the above-described operation taken into account, the valve timing of the intake valve 8 is set to insure the optimum blowback of the EGR gas.

Figure 5:
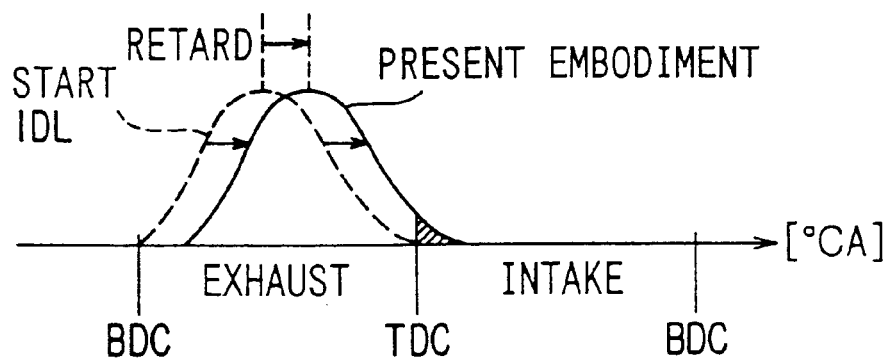
FIG. 5 is a view showing an exhaust valve timing (first embodiment)
Figure 7:
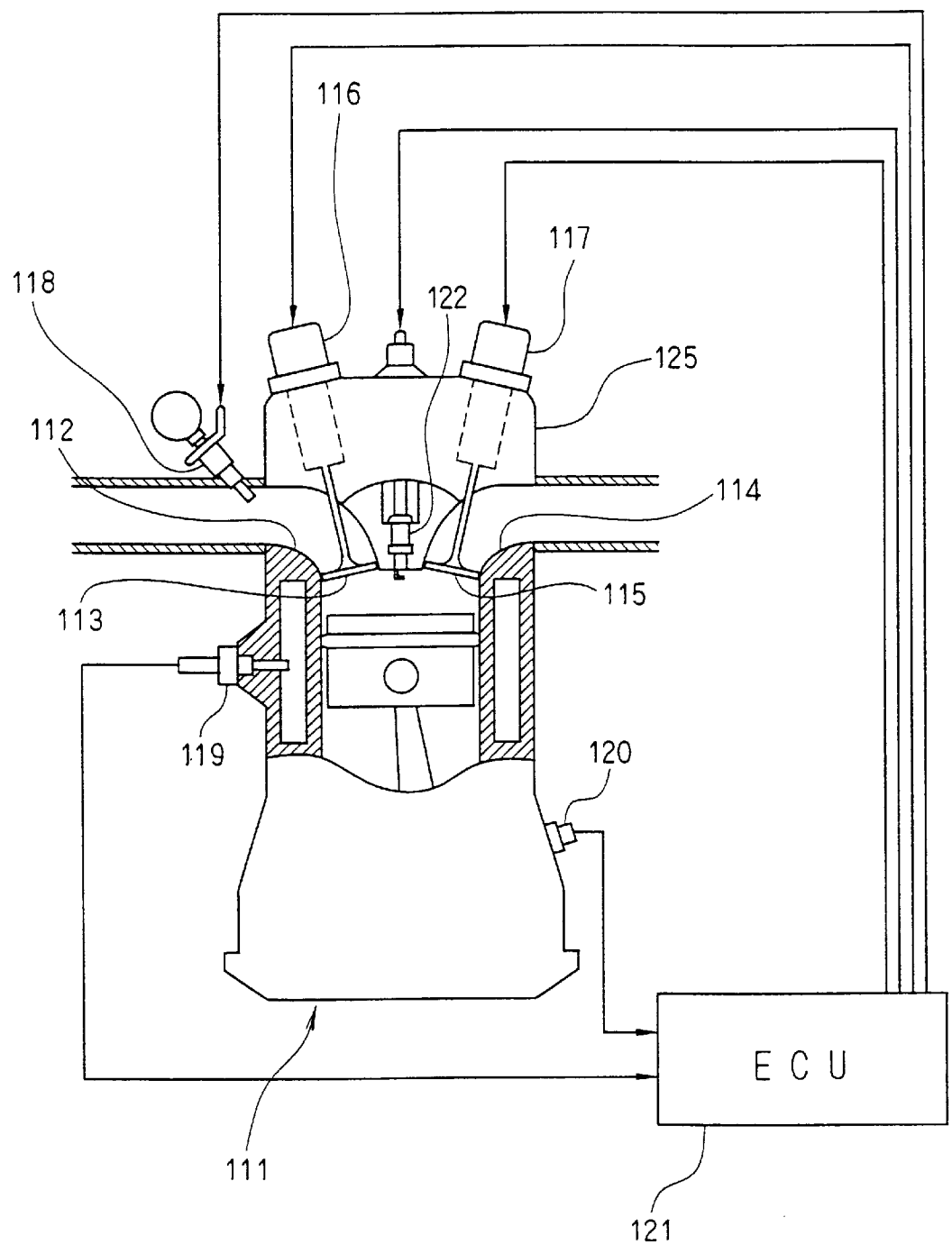
FIG. 7 is a cross-sectional view showing a schematic configuration of an engine (second embodiment)

The valve timing of the exhaust valve 9 is set on the retard side from TDC. If the valve timing of the exhaust valve 9 is set on the advance side from TDC during engine starting or idling operation as shown in FIG. 5, the exhaust valve 9 remains open even when the piston 3 strokes downwardly, thereby allowing a part of the EGR gasses back into the combustion chamber 4. The EGR gas that has been blown back into the combustion chamber 4 reaches the inside of the intake port 6*a*. Therefore, there must be a period when the intake valve 8 and the exhaust valve 9 are simultaneously opened (hereafter "valve overlap") so that the EGR gas blown back into the combustion chamber 4 will reach the inside of the intake port 6*a*.

It is desirable that the intake valve 8 and the exhaust valve 9 be so controlled that the EGR gas of fuel holding on the intake port 6*a* will evaporate as appropriate. In this case, only the intake valve 8 or only the exhaust valve 9 which is operated in the valve overlap state should be controlled so that the EGR gas will be blown back into the intake port 6*a*.

After the setting of the valve timing of the intake valve 8 and the exhaust valve 9 at the desirable value, the processing proceeds to Step 140. At and after Step 140 is shown the control method for every 720° CA after the ignition switch is turned off.

At Step 140, it is determined whether or not the crank angle has passed 720° CA or more after the turning of the ignition switch to off. If 720° CA is not exceeded yet, the processing at Steps 210–230 is repeated. For example, in the case of a four-cylinder engine, the explosion stroke takes place once in each cylinder during the period when the crank angle passes 720° CA, that is, four explosion strokes in total. As regards the setting of injection pulse and ignition control to be performed at Step 220 and at Step 230, the cylinder is determined by the rotation angle sensor 78, thereby setting the explosion stroke in each cylinder.

At Step 210, the valve angle of the throttle valve 17 is set at the same value as in the idling operation. Then, at Step 210, the injection pulse is set in accordance with the amount of intake air determined by the throttle valve angle, to lean the air-fuel ratio, e.g., the air-fuel ratio of 15. According to the method of setting the injection pulse, the injection pulse may be set on the basis of a map to determine the air-fuel ratio of 15, and also may be set by air-fuel ratio feedback control through an unillustrated A/F sensor. The reason for setting the lean air-fuel ratio is for reducing the amount of fuel sticking to the intake pipe 6*a*. The amount of fuel remaining on the intake pipe 6*a*, if decreasing, also decreases after the engine stops, thereby reducing the amount of the HC emissions directly discharged out into the atmosphere on subsequent engine start-up. After setting the fuel injection amount, the processing proceeds to Step 230. At Step 230, the ignition timing is set. The ignition control at this time performs multiple ignitions for perfect combustion of injected fuel and internal EGR gases. The crank angle of 720° CA after turning the ignition switch off as stated above is controlled, thereby completing the routine.

Thereafter, when it is determined that 720° CA or over has elapsed after turning off the ignition switch, the processing goes to Step 150. At Step 150, it is determined whether 1440° CA or more has elapsed after the turning off of the ignition switch. At the crank angle of 1440° CA or under, that is, at the crank angle of from 720° CA to 1440° CA, the processing at Step 195 is executed. At Step 195, injection control at Step 200 and ignition control at Step 230 performed till 720° CA after turning off the ignition switch are finished, then proceeding to the processing at Step 200. At Step 200, the throttle valve 17 is controlled to be fully closed. With the throttle valve 17 fully closed, the pressure in the intake port 6*a* will decrease, allowing evaporation of fuel retaining on the intake port interior. During this period, multiple ignitions are done to reduce the pressure, thereby enabling the combustion of evaporative fuel. Furthermore, as the evaporative fuel is cleaned by the activated three-way catalyst 19 without performing the multiple ignitions, it is possible to prevent the direct discharge of HC emissions into the atmosphere at the time of cold engine starting. Upon completion of the processing at Step 200 for controlling the crank angle of from 720° CA to 1440° CA after the turning of the ignition switch to off, this routine ends.

When it is determined at Step 150 that the crank angle has passed 1440° CA or over after turning the ignition switch off, the processing proceeds to Step 160, where whether the crank angle has exceeded 2160° CA is also determined. When the crank angle under 2160° CA is determined, the processing goes to Step 170, to control the throttle valve 17 to a full-open position. Here, with the throttle valve 17 fully opened to increase the amount of intake air, it becomes possible to scavenge residual evaporative fuel in the internal combustion engine 1 and the fuel holding in the intake port 6*a*, thereby cleaning by the three-way catalyst 19 the residual fuel in the intake port 6*a* and the internal combustion engine 1. Also when it is determined that, at Step 160, 2160° CA and over has elapsed after turning off the ignition switch. Furthermore at Step 160 when it is decided that 2160° CA and over elapsed after turning off the ignition switch, the processing of Step 180 to Step 190 is carried out. At Step 180, the phase of the intake valve 8 and the exhaust valve 9 previously set at Step 130 is changed to a phase suitable for starting, and also the throttle valve 17 is changed to a position suitable for starting. Also at Step 190, the LOW signal is sent from the ECU 80 to the power supply circuit 89, to shut off the power supply to end this routine.

As regards the control of the throttle valve 17, the throttle valve 17 is not kept on in an open state and a closed state during 720° CA, but may be repetitively opened and closed in synchronization with the explosion stroke of each cylinder. When the opening and closing of the throttle valve are repeated, it is desirable to set the amount of opening of the throttle valve 17 with the intake air pulsation taken into account, thereby restraining the intake air pulsation.

The timing chart of the above-described control routine will be explained with reference to FIGS. 6A–6G. In the drawing, a dotted line indicates a conventional art for comparison with the present embodiment. FIG. 6A shows the rotation speed of the engine 1. According to the prior art, the engine 1 is stopped after turning off the ignition switch (hereafter "after IG-OFF") Therefore, the engine speed Ne instantly decreases to zero. According to the present example, however, the engine 1 is kept running in a lean-combustion state even after IG-OFF. Therefore the engine speed Ne gradually decreases to zero.

The routine from IG-OFF to the lapse of 720° CA will be explained. As shown in FIGS. 6B and 6C, the phase of the intake valve 8 and the exhaust valve 9 in relation to the camshaft is changed. The opening timing of the intake valve 8 after IG-OFF is controlled to the advance side from TDC, while the closing timing of the exhaust valve 9 is controlled to the retard side from TDC. Then, the injection pulse is set as shown in FIG. 6D. According to the prior art, no fuel injection is done to stop the engine 1 after IG-OFF. In the present embodiment, however, the injection pulse after IG-OFF is set smaller than that for normal idling operation in order to control the air-fuel ratio to a lean ratio. In this case the throttle valve 17 is controlled to open for normal idling operation as shown in FIG. 6F; therefore the fuel injection amount is controlled little, with the amount of intake air left unchanged, thereby achieving a lean air-fuel mixture. At the same time, because of the adoption of the multiple ignition system, unburned gases in the engine 1 can be fully combusted and exhausted.

Till 1440° CA after IG-OFF, the throttle valve is fully closed as shown in FIG. 6F, to reduce the pressure in the intake port 6a as shown in FIG. 6E, thereby vaporizing the fuel holding on the intake port 6a. As shown in FIG. 6G, therefore, a wet portion of the air-fuel mixture in the intake port 6a decreases largely as compared with the prior art.

Thereafter, till 2160° CA after IG-OFF, the throttle valve is fully opened as shown in FIG. 6F. The amount of intake air is increased by thus controlling the throttle valve 17, thereby scavenging the fuel sticking to the intake port 6a and the vaporized fuel remaining in the engine 1 and accordingly occluding, adsorbing and/or cleaning the fuel by the use of the HC adsorbing catalyst in an activated state and the three-way catalyst. The intake pipe pressure, as shown in FIG. 6E, increases with the amount of opening of the throttle valve. It is possible, by controlling, to substantially reduce the wet fuel in the intake portion 6a as compared with the prior art as shown in FIG. 6G.

In the present embodiment, the ignition signal detecting means functions equivalently to Step 110 in FIG. 3; the valve timing setting means, to Step 130 in FIG. 3; the fuel injection amount reducing means, to Step 220 in FIG. 3; and throttle control means, to Steps 170, 210, and 200 in FIG. 3.

Second Embodiment

The second embodiment will be described with reference to FIGS. 7–10. The schematic configuration of the engine will be explained with reference to FIG. 7. In an intake port 112 of each cylinder of an engine 111 being an internal combustion engine, an electromagnetic intake valve 113 is provided. Also in an exhaust port 114 of each cylinder, an electromagnetic exhaust valve 115 is provided. The intake valve 113 and the exhaust valve 115 are driven by electromagnetic actuators 116 and 117, respectively. In the vicinity of the intake port 112 of each cylinder, a fuel injection valve 118 is provided for injecting fuel. In the cylinder head of each cylinder, a spark plug 122 is provided. In the meantime, in the cylinder block of the engine 111, a water temperature sensor 119 for detecting the cooling water temperature and a crank angle sensor 120 for detecting the engine speed are provided.

The output of the water temperature sensor 119 and the crank angle sensor 120 is supplied to an engine control unit 121. The engine control unit 121 mainly comprises a microcomputer, which execute various control programs stored in a built-in ROM (a storing medium), thereby functioning as a fuel injection control means for controlling a fuel injection amount and a fuel injection timing of the fuel injection valve 118 in accordance with the condition of engine operation.

The engine control unit 121 functions as a valve control means for controlling the opening-closing operation of the valves 113, 115 by controlling the electromagnetic actuators 116, 117 of the valves 113, 115. At this time, the engine control unit 121 executes the intake valve control program shown in FIG. 8 which has been stored in the built-in ROM (the storing medium), to perform an normal valve opening control for opening the intake valve 113 only by the intake stroke during normal operation (indicated by a dotted line in FIG. 9). During the execution of control for early warming the catalyst, a twice valve-opening control is executed to open the intake valve 113 twice, that is, once on either of the intake stroke and the exhaust stroke (indicated by a solid line in FIG. 9). As described above, in the second embodiment, the electromagnetic actuators 116, 117 are used instead of the variable valve timing mechanisms 25a, 25b. Since the electromagnetic actuators 116, 117 are used in this way, the following control can be executed.

Figure 8:
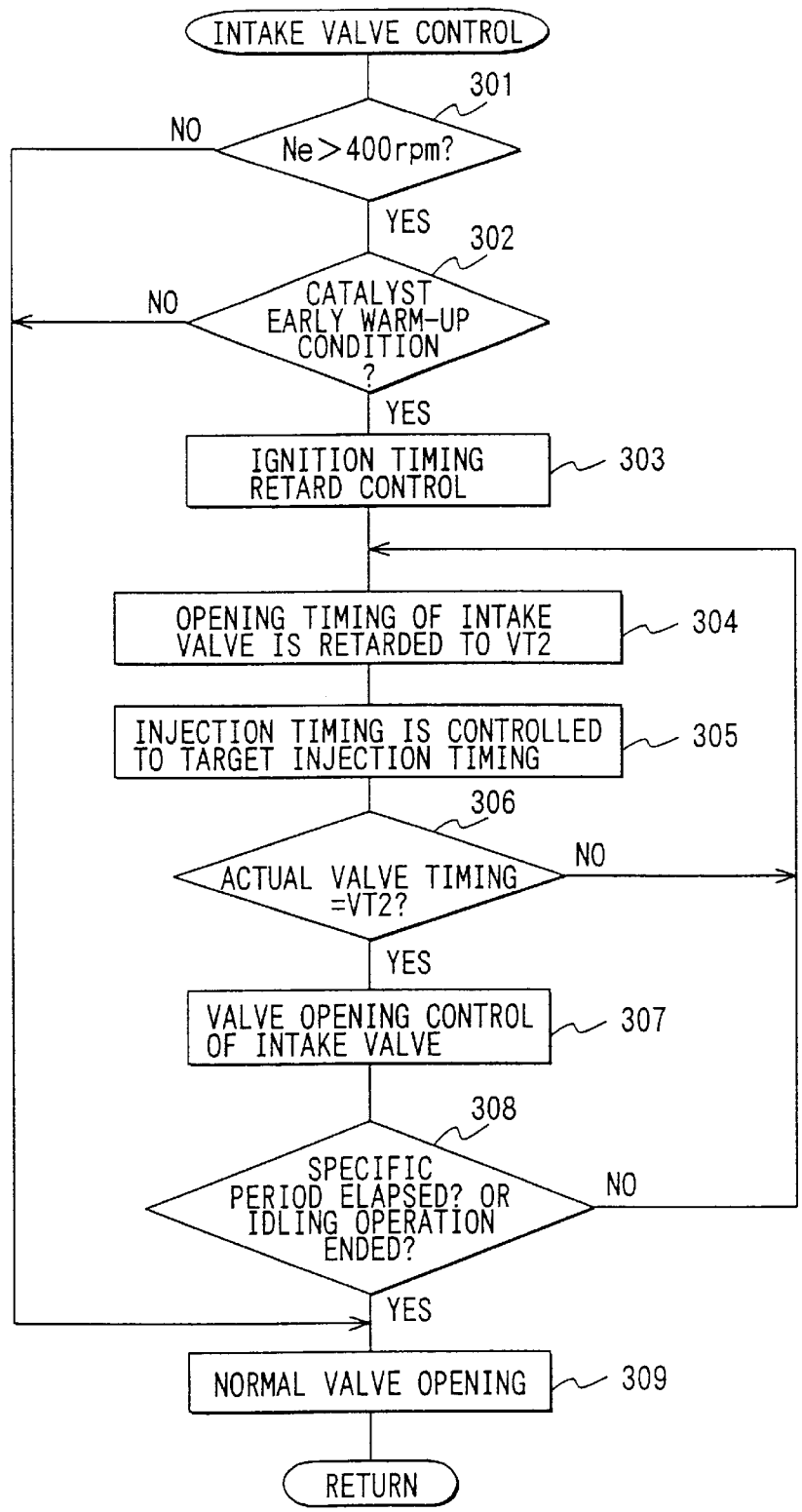
FIG. 8 is a flowchart showing a flow of processing of an intake valve control program (second embodiment)

Hereafter, details of the intake valve control program processing operation of FIG. 8 will be explained.

The program is repetitively performed by each specific time or each specific crank angle. When this program is started, first at Step 301, the completion of engine starting is evaluated by checking whether or not the engine speed NE is higher than a completion-explosion evaluation value (e.g., 400 rpm). If engine starting is not completed yet, the processing goes to Step 309, where the normal valve opening control is performed to open the intake valve 113 only on the intake stroke as indicated by the dotted line in FIG. 9. In the normal valve opening control, the intake valve 113 is controlled so that the valve timing of the intake valve 113 will be the target valve timing VT1 (e.g., around TDC of intake stroke) for normal valve opening control.

Thereafter, at Step 301, when the completion of engine starting has been determined, the processing goes to Step 302, where it is checked to see whether or not the condition for executing the early warm-up of the catalyst has been established, for example whether or not the cooling water temperature is lower than the specific temperature (e.g., 50° C.). If the condition for executing the early warm-up of the catalyst is not established, the processing proceeds to Step 309 to continue to perform the normal valve opening control even after the completion of engine starting.

When the condition for executing the early warm-up of the catalyst has been established (for cold engine starting), the processing goes to Step 303, where the ignition timing retard control is performed to retard the ignition timing of the spark plug 122 to the target ignition timing (e.g., 5° CA ATDC) for the early warm-up of the catalyst, thereby raising the exhaust gas temperature and accelerating warming up the catalyst.

Figure 9:
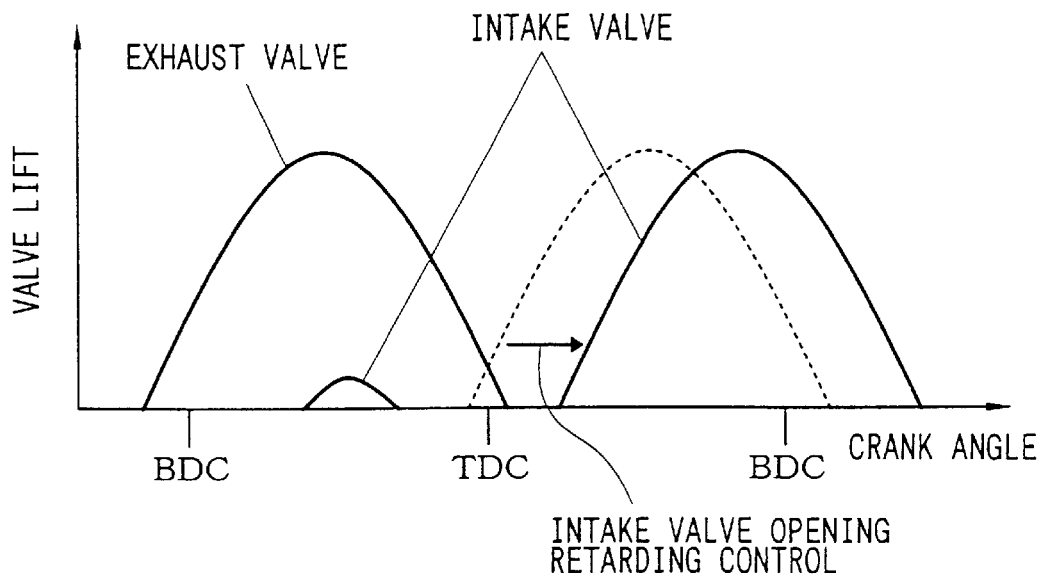
FIG. 9 is a view showing valve operation characteristics (second embodiment)

Thereafter, the twice valve-opening control is executed to open the intake valve 113 twice (at Steps 304–308), by opening the intake valve 113 once on the exhaust stroke and also once on the intake stroke as indicated by solid lines in FIG. 9.

When the twice valve-opening control is performed, first at Step 304, the valve timing of the intake valve 113 during the intake stroke is retarded to the target valve opening timing VT2 (e.g., 20° CA ATDC) for the twice valve-opening control. The target valve opening timing VT2 for twice valve-opening control may be set as a fixed value on the retard side of TDC on the intake stroke, and also may be calculated by a map in accordance with the condition of engine operation. The valve timing of the intake valve 113 during the intake stroke, therefore, is controlled to the retard side of TDC during the intake stroke.

Then, at Step 305, the injection timing of the fuel injection valve 118 is controlled to the target injection timing for twice valve-opening control. The target injection timing for twice valve-opening control is set at the injection timing at which the fuel to be injected during the valve-opening period of the intake valve 113 during the intake stroke reaches the opening of the intake valve 113, and also no fuel will be injected during the valve-opening period of the intake valve 113 during the exhaust stroke.

Subsequently at Step 306, it is decided whether or not the actual valve timing of the intake valve 113 has become the target valve timing VT2 for twice valve-opening control.

Then, after ascertaining that the actual valve timing of the intake valve 113 has become the target valve timing VT2 for twice valve-opening control, the processing proceeds to the next Step 307. At this step, the valve timing control of the intake valve 113 during the exhaust stroke (during the valve-opening period of the exhaust valve 115) is executed, thereby opening the intake valve 113 once during the exhaust stroke and once during the intake stroke. The valve-opening period and lift of the intake valve 113 during the exhaust stroke are so controlled as to be smaller than those of the intake valve 13 during the intake stroke.

Subsequently, the processing proceeds to Step 308, where it is determined whether or not the specific period of time after starting has elapsed, or whether or not the idling operation has ended, thereby determining whether or not the condition for ending the early catalyst warm-up operation has been established. During the period when the condition for ending the early warm-up of the catalyst is not established, that is, during the period of execution of the early warm-up of the catalyst, the twice valve-opening control of the intake valve 113 is continued (Steps 304–308).

Thereafter, at Step 308, when it is determined that the specific period of time passed after starting, or that the idling operation ended, the condition for ending the early catalyst warm-up operation is determined as established, then proceeding to Step 309 to end the twice valve-opening control of the intake valve 113, to execute normal valve opening control, and to open the intake valve 113 only during the intake stroke. At this time, the injection timing of the fuel injection valve 118 is changed over to normal control.

An example of the intake valve control of the second embodiment will be explained with reference to FIG. 10.

Figure 10:
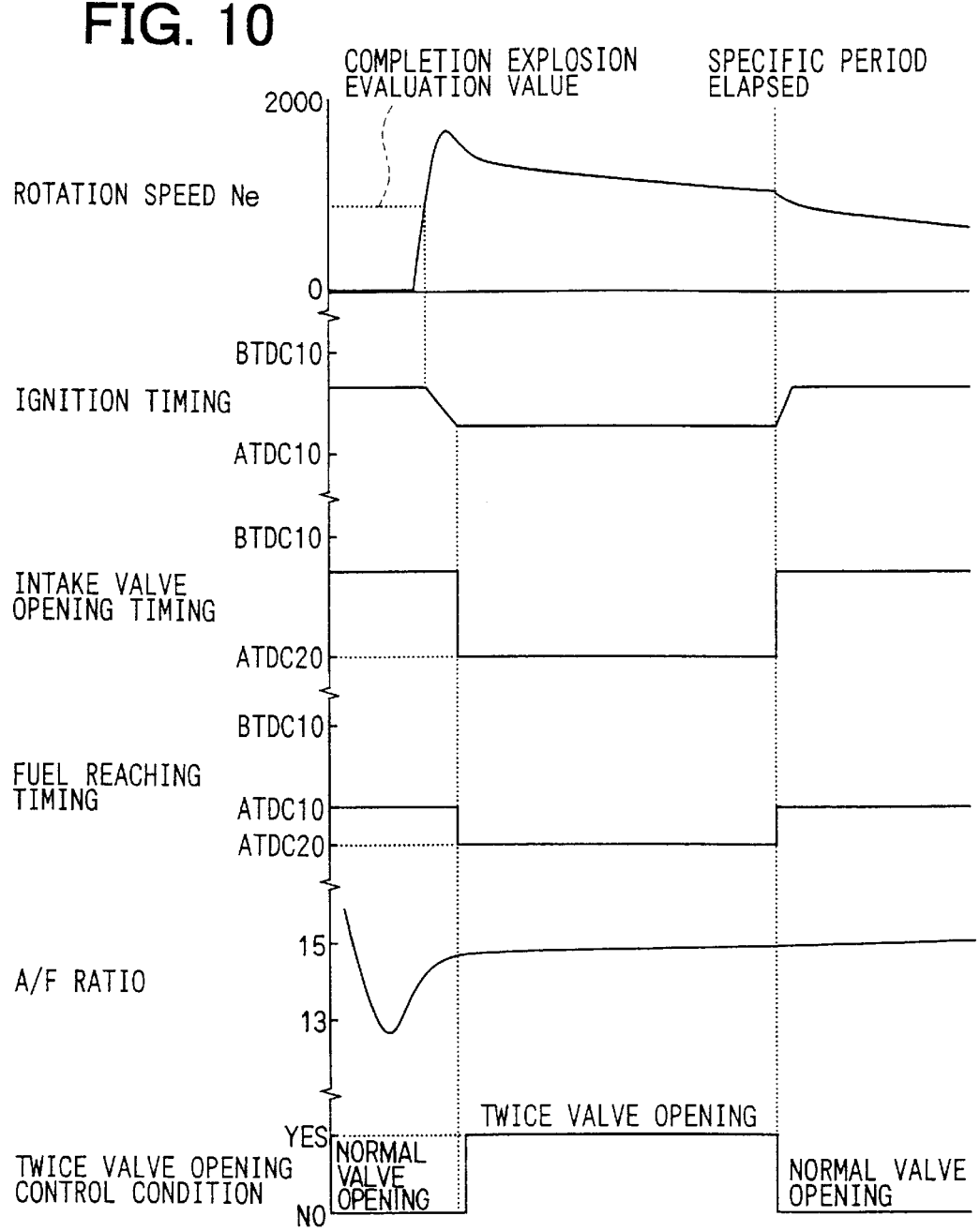
FIG. 10 is a time chart showing an example of execution of the intake valve control (second embodiment)

As shown in the time chart of FIG. 10, when the ignition timing is retarded with the establishment of the condition for executing the early catalyst warm-up operation after completion of engine starting, first the valve opening timing of the intake valve 113 during the intake stroke is controlled to retard to the target valve timing VT2 (e.g., 20° CA ATDC) for the twice valve-opening control. Then, at the time when the actual valve timing of the intake valve 113 reaches the target valve timing VT2, the valve timing control is started to open the intake valve 113 during the exhaust stroke, thereby enabling the twice valve-opening control to open the intake valve 113 twice, that is, once during either of the exhaust stroke and the intake stroke. Thereafter, when the condition for ending the early catalyst warm-up operation has been established after the lapse of a specific period of time after starting, the intake valve 113 is changed from the twice valve-opening control over to the normal valve opening control, to open the intake valve 113 only during the intake stroke.

During execution of the twice valve-opening control, when the intake valve 113 is opened during the exhaust stroke, the intake air waiting in the intake pipe can be efficiently warmed up with hot combustion gases immediately after combustion in the cylinder. Thereafter, when the intake valve 113 is opened during the intake stroke, the heated intake air can be charged efficiently into the cylinder. In this case, the intake valve 113 can be opened on the exhaust stroke (to heat the intake air with the combustion gases in the cylinder) also during the intake stroke (to charge the intake air into the cylinder) independently at the optimum timing. Therefore, both the intake air heating performance and the intake air charging performance can be performed on a high level. Therefore, the twice valve-opening control during the period of execution of the early catalyst warm-up operation is performed, so that the amount of HC emissions can be reduced by the effect of reducing the wet portion of the injected fuel and accelerating fuel atomization (the effect of improving combustibility) by heating the intake air even during the period of execution of early catalyst warm-up operation at which the exhaust gas cleaning capacity of the catalyst is low. Also it is possible to improve fuel economy and engine operation stability by the effect of achieving the intake air charging performance.

Furthermore, in the second embodiment, the intake valve timing retarding control is performed to retard the valve timing of the intake valve 113 during the intake stroke to the retard side of TDC during the intake stroke. Therefore, the piston goes downward from TDC during the intake stroke until the cylinder pressure decreases to open the intake valve 113. Then, the intake air is drawn in a stroke into the cylinder from the intake pipe, thereby enabling to increase the intake air flow velocity, to accelerate injection fuel atomization, and accordingly to improve the effect of reducing the HC emissions.

Furthermore, in the present second embodiment, the injection timing of the fuel injection valve 118 is controlled to the target injection timing for the twice valve opening control, to allow the injection fuel to reach the opening portion of intake valve 113 during valve opening period of the intake valve 13 during the intake stroke, and to check fuel injection during the valve opening period of the intake valve 113 during the exhaust stroke. Therefore, the fuel injected can be checked from being blown back by the combustion gases flowing back to the intake side during the valve opening period of the intake valve 113 during the exhaust stroke while being rapidly drawn into the cylinder without staying in the intake port. It is, therefore, possible to reduce the amount of the injected fuel holding in the inside wall of the intake port 112 and on the intake valve 113, thereby enabling an improvement of air-fuel ratio control accuracy.

If, in this case, the valve-opening period and lift of the intake valve 113 during the exhaust stroke are excessively increased, the amount of EGR gases inside (the amount of combustion gases remaining in the cylinder) increases. Accordingly, the rate of fresh air charged in the cylinder during the intake stroke (the amount of fresh air supplied into the cylinder from the intake pipe) lowers, thereby worsening the state of combustion. In the present second embodiment, therefore, the valve opening period and lift of the intake valve 113 during the exhaust stroke are so controlled as to decrease the valve opening period and lift of the intake valve 113 during the intake stroke. Therefore, it is possible to restrain the excessive increase in the amount of EGR gases inside and also to prevent worsening of combustion by EGR inside.

Third Embodiment

Figure 11:
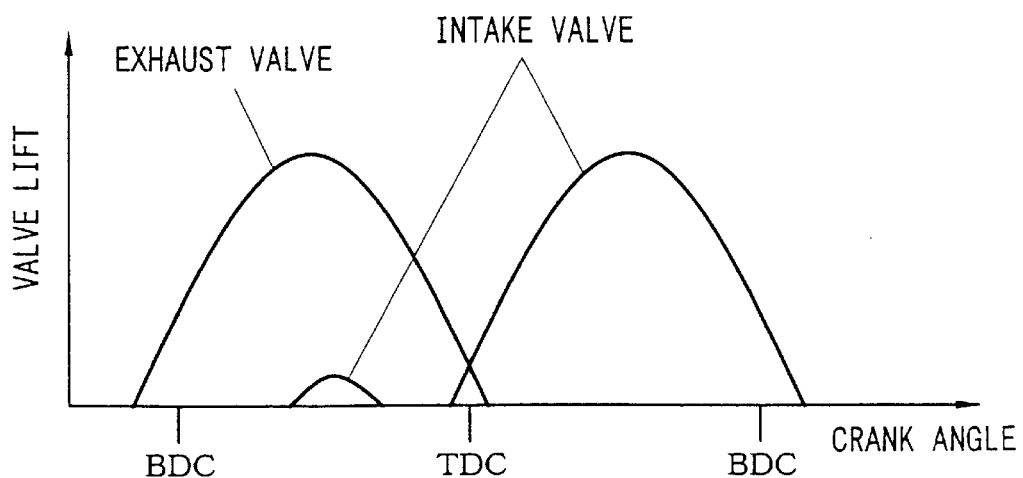
FIG. 11 is a view showing valve operation characteristics (third embodiment)

In the second embodiment, during the twice valve-opening control of the intake valve 113, the intake valve timing retarding control is performed to control the valve timing of the intake valve 113 during the intake stroke to the retard side of TDC during the intake stroke. In the present third embodiment in FIG. 11, the valve timing of the intake valve 113 during the intake stroke may be controlled to the valve timing as the normal valve opening control without performing the intake valve opening retarding control during the twice valve-opening control of the intake valve 113.

Even in this case, it is possible to improve fuel economy and engine operation stability and to achieve the intake air charging performance by opening the intake valve 113 during the intake stroke while reducing the amount of HC emissions by heating the intake air with the intake valve 113 during the exhaust stroke opened.

Fourth Embodiment

Figure 12:
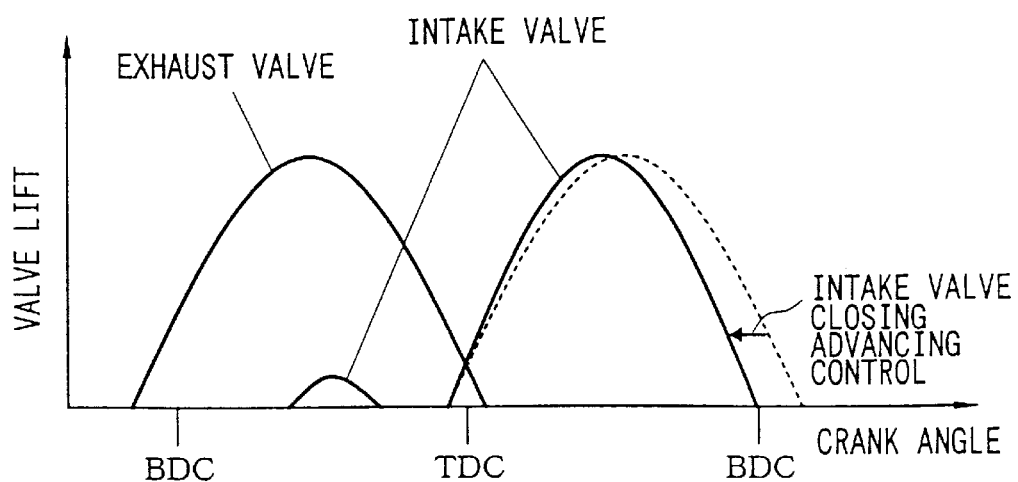
FIG. 12 is a view showing valve operation characteristics (fourth embodiment)

In the fourth embodiment, as shown in FIG. 12, the valve opening timing of the intake valve 113 during the intake stroke is controlled to the same timing (around TDC during intake stroke) as the normal valve opening control during the twice valve-opening control of the intake valve 113. Also the intake valve closing advancing control is performed to control the valve closing timing of the intake valve 113 during the intake stroke to around BDC during the intake stroke.

Furthermore, it is possible to increase the effective compression ratio (charging efficiency) to gain a greater combustion pressure by controlling the intake valve closing advancing control to close the intake valve 113 at around BDC during the intake stroke. Therefore, the combustion stability during the period of execution of early catalyst warm-up operation can be further improved and accordingly the engine operation (idling operation) during the period of execution of early catalyst warm-up operation can be further stabilized.

Fifth Embodiment

Figure 13:
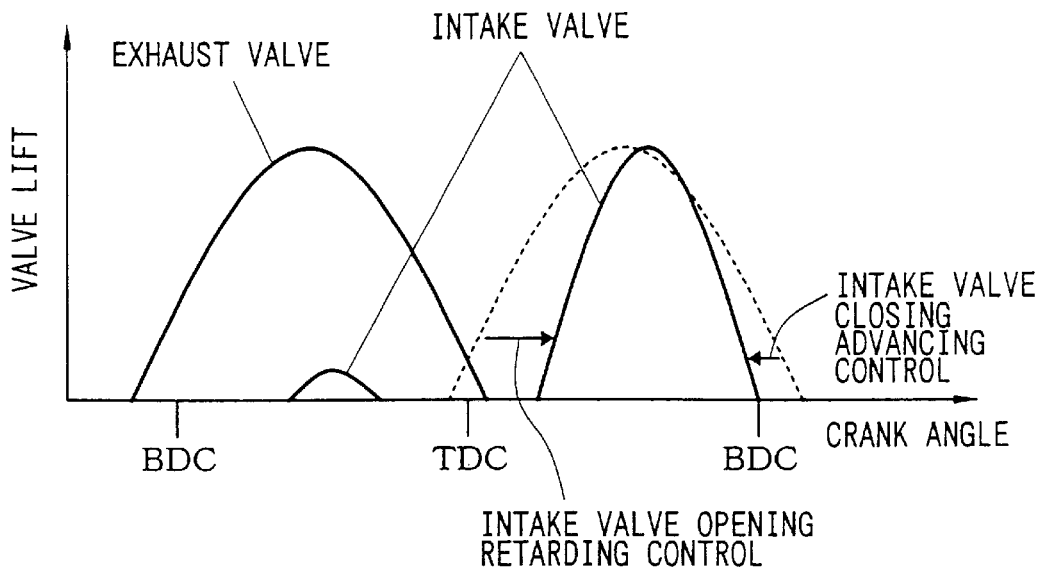
FIG. 13 is a view showing valve operation characteristics (fifth embodiment)

In the fourth embodiment, only the intake valve closing advancing control is carried out during the twice valve-opening control of the intake valve 113. In the present fifth embodiment, as shown in FIG. 13, both the intake valve opening retarding control and the intake valve closing advancing control are carried out during the twice valve opening control of the intake valve 113, to control the valve closing timing of the intake valve 113 during the intake stroke to the retard side of TDC during the intake stroke, and the valve closing timing of the intake valve 113 during the intake stroke to around BDC during the intake stroke.

According to the fifth embodiment, the intake valve closing advancing control to improve the stability of engine operation (idling operation) by the effect of improving combustion stability while performing the intake valve opening retarding control to enhance the effect of improving the exhaust emissions by the effect of accelerating the atomization of injection fuel.

Sixth Embodiment

Figure 14:
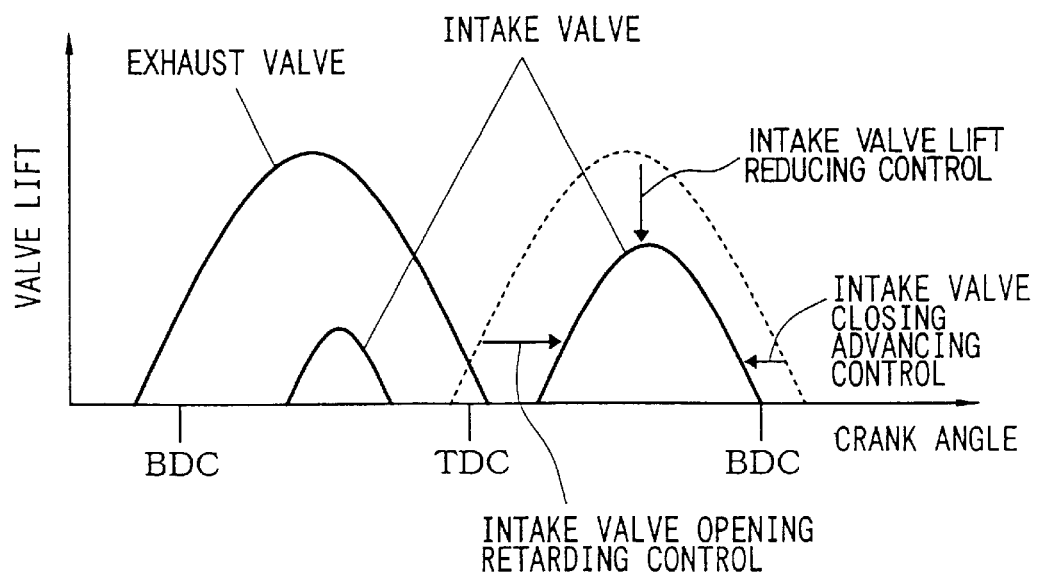
FIG. 14 is a view showing valve operation characteristics (sixth embodiment)

In the fifth embodiment, only the valve opening-closing timing of the intake valve 113 is changed during the twice valve opening control of the intake valve 113, to perform the intake valve opening retarding control and the intake valve closing advancing control. In the present sixth embodiment, as shown in FIG. 14, the valve opening-closing timing of the intake valve 113 is changed to perform the intake valve opening retarding control and the intake valve closing advancing control, and also to perform the intake valve lift reducing control to control the lift of the intake valve 13 to smaller than the normal lift.

The cross sectional area of the flowpath during the opening of the intake valve 113 can be reduced to less than a normal one by setting the lift of the intake valve 113 smaller than normal one. Thus, it is possible to further increase the intake airflow velocity and to further enhance the effect of accelerating the atomization of fuel injected.

In the present sixth embodiment, all of the three controls including the intake valve opening retarding control, the intake valve closing advancing control, and the intake valve lift reducing control are carried out during the twice valve opening control of the intake valve 113. It is to be noted, however, that either one of the intake valve opening retarding control and the intake valve closing advancing control, and the intake valve lift reducing control, or only the intake valve lift reducing control may be performed.

Seventh Embodiment

Figure 15:
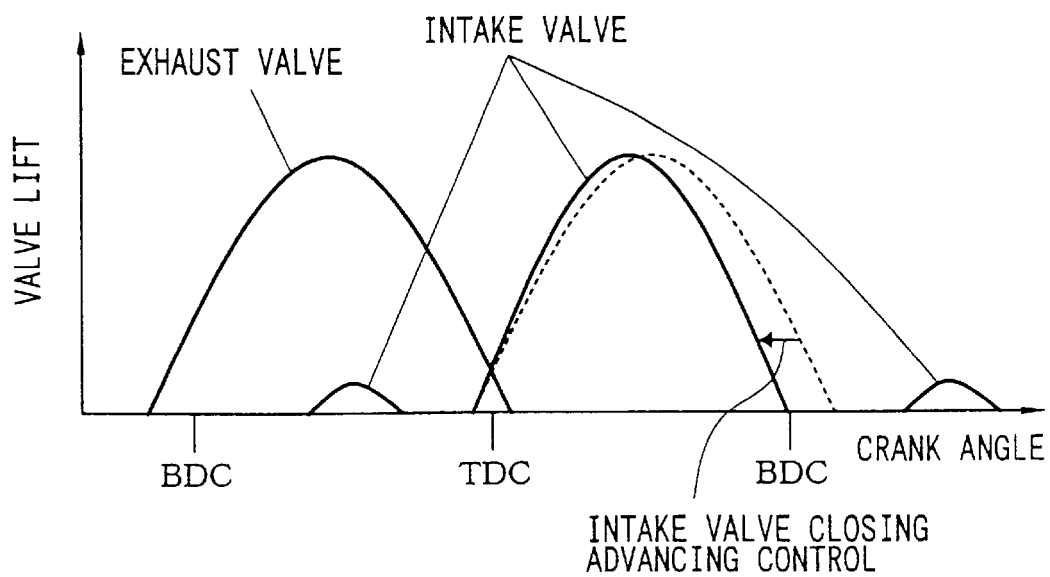
FIG. 15 is a view showing valve operation characteristics (seventh embodiment).

In the second through sixth embodiments, the twice valve opening control is carried out to open the intake valve 113 once during either of the exhaust stroke and the intake stroke. In the seventh embodiment, as shown in FIG. 15, a three-time valve opening control is performed to open the intake valve 113 once during each of the exhaust stroke, the intake stroke, and during the compression stroke. In this case, the intake valve closing advancing control is performed to control the closing timing of the intake valve 113 during the intake stroke to around BDC during the intake stroke. Also, the valve opening period and/or lift of the intake valve 113 during the compression stroke is controlled to less than the valve opening period and/or lift of the intake valve 113 during the intake stroke.

As above-described, the intake valve closing advancing control during the intake stroke is performed to close the intake valve 113 at around BDC during the intake stroke, thereby increasing the effective compression ratio (charging efficiency) to achieve a higher combustion pressure. Therefore, it is possible to stabilize the engine operation (idling operation) by improving the combustion stability. In this case, however, if the effective compression ratio is excessively high, a pumping loss will increase to worsen fuel economy.

In the present seventh embodiment, with the above-described situation taken into consideration, the three-time valve opening control is carried out to open the intake valve 113 during the compression stroke. Therefore, it is possible to lower the effective compression ratio, to reduce the pumping loss, and to prevent fuel economy from worsening as appropriate by opening the intake valve 113 during the compression stroke.

In this case, it should be noticed that as the valve opening period and lift of the intake valve 113 during the compression stroke are increased, the pumping loss decreases. Therefore, the effective compression ratio may lower to decrease the combustion pressure, and result in deteriorated engine operation stability. With this point taken into account, in the present seventh embodiment, the valve opening period and/or lift of the intake valve 113 during the compression stroke is controlled to smaller than the valve opening period and/or lift of the intake valve 113 during the intake stroke. Therefore, it is possible to restrain the rate of decrease of the combustion pressure (the rate of decrease of the effective compression ratio) so much as to achieve the stability of engine operation.

In the present seventh embodiment, the intake valve closing advancing control during the intake stroke is performed. It should be noticed that the control of the intake valve 113 during the intake stroke during the three-time valve opening control is not limited to the intake valve closing advancing control and may be changed as required.

Here, in the second through seventh embodiment, the electric power is supplied for a predetermined period after the ignition switch is turned off, so that the ECU 121 controls the electromagnetic actuators 116, 117 even after the ignition switch is tuned off, as in the first embodiment.

Modifications

In the above-described second through seventh embodiments, a multiple-time valve opening control (twice or three-time valve opening control) of the intake valve 113 is performed during the period of execution of early catalyst warm-up operation. It is to be understood, however, that the execution of the multiple-time valve opening control of the intake valve 113 is not limited to the period of execution of the early catalyst warm-up operation, and may be performed in, for example, at least one of the idling operation, low-speed operation, and low-load operation. During the idling operation or during the low-speed operation, the opening-closing operation of the intake valve 113 can be accurately controlled simply by opening and closing the intake valve 113 multiple times in a relatively long cycle. Also during the low-load operation requiring no great engine output, insufficient engine output will not occur if the multiple-time valve opening control is performed of the intake valve 113.

In the above-described second through seventh embodiments, the valve timing and lift of the exhaust valve 115 are fixed; however, it should be understood that the present invention may be applied to a system which can change the valve timing and lift of the exhaust valve 115.

Furthermore, it should be understood that variations of the present invention are applicable, for example, to setting the number of times the intake valve 113 is opened in one cycle.

What is claimed is:

1. A control apparatus for an internal combustion engine comprising:
    a variable valve timing mechanism for setting a valve timing by driving at least one of an intake valve and an exhaust valve for opening and closing an intake passage and an exhaust passage respectively which communicate with a combustion chamber of the internal combustion engine;
    an ignition signal detecting means for detecting that an ignition switch is turned off to stop the internal combustion engine;
    an intake-exhaust valve timing setting means for setting the valve timing of at least one of said intake valve and said exhaust valve; and
    a catalyst provided in said exhaust passage, for cleaning exhaust gases discharged from the internal combustion engine, wherein
    said intake-exhaust valve timing setting means sets the valve timing of at least one of said intake valve and said exhaust valve to a specific valve timing at which fuel sticking to an intake pipe of the internal combustion engine is reduced when said ignition signal detecting means detects that said ignition switch is turned off.

2. A control apparatus for an internal combustion engine according to claim 1, wherein the specific intake valve timing is on an advance side of top dead center (TDC).

3. A control apparatus for an internal combustion engine according to claim 1, wherein the specific exhaust valve timing is on a retard side of top dead center (TDC).

4. A control apparatus for an internal combustion engine according to claim 1, further comprising:
    a fuel injection valve for injecting the fuel into said intake pipe;
    a spark plug for burning, in the combustion chamber, the fuel injected by said fuel injection valve;
    a fuel injection amount setting means for setting an injection amount of the fuel injected by said fuel injection valve at less than a fuel injection amount during idling operation for a first specific period when said ignition switch in off position has been detected by said ignition signal detecting means; and
    an ignition control means for controlling ignition by said spark plug for a specific period when the ignition switch in off position has been detected.

5. A control apparatus for an internal combustion engine according to claim 4, wherein said ignition control means controls said spark plug by multiple ignition in the first specific period.

6. A control apparatus for an internal combustion engine according to claim 4, further comprising:
    a throttle valve for controlling an amount of air taken into the internal combustion engine; and
    a throttle valve control means for controlling an amount of opening of said throttle valve to reduce the fuel sticking to said intake pipe of the internal combustion engine when said ignition switch in off position is detected by said ignition signal detecting means.

7. A control apparatus for an internal combustion engine according to claim 6, wherein said throttle valve control means sets the amount of opening of said throttle valve in a second specific period smaller than that for the first specific period upon a termination of the first specific period.

8. A control apparatus for an internal combustion engine according to claim 7, wherein said throttle valve control means sets the amount of opening of said throttle valve in a third specific period larger than that for the first specific period upon a termination of the second specific period.

9. A control apparatus for an internal combustion engine according to claim 8, wherein said intake-exhaust valve timings setting means sets the valve timings of said intake valve and said exhaust valve to valve timings suitable for subsequent starting after a termination of the third specific period.

10. A control apparatus for an internal combustion engine according to claim 7, wherein said intake-exhaust valve timing setting means sets an amount of overlap more than a specific value by adjusting the valve timing of at least one of said intake valve and said exhaust valve during the second specific period.

11. A control method for an internal combustion engine including a variable valve timing mechanism for setting a valve timing by driving at least one of an intake valve and an exhaust valve which respectively open and close an intake passage and an exhaust passage communicating with a combustion chamber of the internal combustion engine, and a catalyst provided in said exhaust passage for adsorption and cleaning of exhaust gases from the internal combustion engine, comprising the steps of:
    detecting that an ignition switch is turned off for stopping the internal combustion engine; and
    setting the valve timing of at least one of said intake valve and said exhaust valve to a specific valve timing suitable for reducing fuel sticking to an intake pipe of the internal combustion engine after detecting that said ignition switch is turned off.

12. A control method for an internal combustion engine according to claim 11, further including the steps of:
    continuing injection of a smaller amount of fuel than a fuel injection amount before turning off said ignition switch, and continuing a control for igniting the fuel for a first specific period after detection of said ignition switch in off position.

13. A control method for an internal combustion engine according to claim 12, further including the steps of:
    setting an amount of opening of a throttle valve provided in said intake passage at a particular amount for idling operation of the internal combustion engine for the first specific period after detection of said ignition switch in off position.

14. A control method for an internal combustion engine according to claim 13, further including the steps of:
    setting the amount of opening of said throttle valve smaller than the particular amount for idling operation of the internal combustion engine for a second specific period after the first specific period has elapsed.

15. A control method for an internal combustion engine according to claim 14, further including the steps of:
    setting the amount of opening of said throttle valve larger than the particular amount for idling operation of the internal combustion engine for a third specific period after the second specific period has elapsed.

16. A control method for an internal combustion engine according to claim 15, wherein after the third specific period has elapsed, the valve timings of said intake valve and said exhaust valve are set at valve timings for starting the internal combustion engine, and the amount of opening of said throttle valve is set at an amount of opening of said throttle valve for starting the internal combustion engine.

17. A valve control apparatus for an internal combustion engine comprising:

an actuator for driving an intake valve of the internal combustion engine; and a valve control means for controlling an opening and closing operation of said intake valve by controlling said actuator, wherein said valve control means performs a multiple-time valve opening control to open said intake valve by a plurality of times in one cycle of operation of the internal combustion engine; and said valve control means opens said intake valve in both an exhaust stroke and an intake stroke during the multiple-time valve opening control.

18. A valve control apparatus for an internal combustion engine according to claim 17, wherein said valve control means controls a valve opening timing of said intake valve during the intake stroke to a retard side of top dead center (TDC) during the intake stroke.

19. A valve control apparatus for an internal combustion engine according to claim 17, wherein said valve control means controls a lift of said intake valve during the intake stroke to smaller than a normal value during the multiple-time valve opening control.

20. A valve control apparatus for an internal combustion engine according to claim 17, wherein said valve control means controls a valve closing timing of said intake valve during the intake stroke to around BDC during the intake stroke during the multiple-time valve opening control.

21. A valve control apparatus for an internal combustion engine according to claim 17, further including a fuel injection control means for controlling a fuel injection valve, wherein said fuel injection control means controls an injection timing of said fuel injection valve so that a fuel injected reaches an opening portion of said intake valve when said intake valve opens during the intake stroke.

22. A valve control apparatus for an internal combustion engine according to claim 17, further including a fuel injection control means for controlling a fuel injection valve, wherein said fuel injection control means controls a fuel injection timing of said fuel injection valve so as not to inject a fuel when said intake valve opens during the exhaust stroke during the multiple-time valve opening control.

23. A valve control apparatus for an internal combustion engine according to claim 17, wherein said valve control means controls at least one of a valve opening period and a lift of said intake valve during the exhaust stroke to smaller than the valve opening period and the lift of said intake valve during the intake stroke, during the multiple-time valve opening control.

24. A valve control apparatus for an internal combustion engine according to claim 17, wherein said valve control means opens said intake valve not only during the exhaust stroke and the intake stroke but also during a compression stroke, during the multiple-time valve opening control.

25. A valve control apparatus for an internal combustion engine according to 24, wherein said valve control means controls at least one of a valve opening timing and a lift of said intake valve during the compression stroke to smaller than the valve opening period and the lift of said intake valve during the intake stroke, during the multiple-time valve opening control.

26. A valve control apparatus for an internal combustion engine according to claim 17, wherein said valve control means performs the multiple-time valve opening control when the engine is operating under a condition of at least one of idling operation, low-speed operation, and low-load operation.

27. A method of controlling internal combustion engine, the method comprising:

driving, via an actuator, an intake valve of the internal combustion engine; and controlling an opening and closing operation of said intake valve by controlling said actuator;

performing a multiple-time valve opening control to open said intake valve by a plurality of times in one cycle of operation of the internal combustion engine; and wherein said intake valve is opened in both an exhaust stroke and an intake stroke during the multiple-time valve opening control.

* * * * *